Aug. 9, 1932.   J. C. BOLT ET AL   1,870,230
DISTANCE CONTROL DEVICE
Filed Nov. 21, 1930   6 Sheets-Sheet 3

Patented Aug. 9, 1932

1,870,230

UNITED STATES PATENT OFFICE

JOSEPH CLARENCE BOLT, OF BOSTON, AND CURT I. JOHNSON, OF WORCESTER, MASSACHUSETTS, ASSIGNORS TO THE TABULATING MACHINE COMPANY, OF ENDICOTT, NEW YORK, A CORPORATION OF NEW JERSEY

DISTANCE CONTROL DEVICE

Application filed November 21, 1930. Serial No. 497,236.

This invention relates to record controlled machines in general and in particular to machines arranged to duplicate record mediums used to control statistical and accounting machines such as, for example, machines of the type embodying the well known Hollerith system.

The broad object of the present invention is to provide a novel and improved system whereby the controlling records utilized to control the operation of statistical and accounting machines may be reproduced or duplicated at a point which may be remotely located with respect to the point where the original records were prepared.

A number of existing statistical and tabulating systems, of which the Hollerith system is an example, employ controlling records consisting of cards each of which is divided into a plurality of columns having twelve index point positions at any of which index point positions a perforation may be made according to the value to be represented by such perforation. Statistical data are represented by combinations of perforations in a field comprising a plurality of columns in each of which a perforation may be present.

It is frequently found necessary or desirable to duplicate such record cards either in whole or in part and for this purpose duplicating machines have been developed of which the machine illustrated in United States Letters Patent No. 1,772,186, granted August 5, 1930, to F. L. Lee and B. H. Phillips, is an example. Such machines usually include an analyzer for reading the perforations in the cards, a punch selecting device controlled by the analyzer, and a perforating mechanism for effecting the physical perforation of a duplicate card to correspond with the original card.

The present invention has for one of its main objects to provide a system in which the reading or analyzing and punch selecting devices of one of such duplicating devices are utilized to control the punch selecting and perforating devices of a substantially similarly constructed machine located at a point more or less remote from the machine used as a reading or analyzing machine.

Another object of the present invention is to provide a novel arrangement of circuits and devices controlled thereby for translating the index point values of the perforations in the cards used to control the system into series of timed electrical impulses or code signals for transmission over a line circuit and to provide another arrangement of devices and circuits for translating said impulses at the other end of said line into perforations in a duplicate card corresponding in value and location to the perforations in the control cards. That is, the present invention contemplates providing a novel coding apparatus adapted to read perforations present in successive columns of the control card and transmit each of said readings in the form of a definite series of electrical impulses over a line circuit, at the other end of which a novel apparatus translates or decodes said impulses and controls the receiver in such a manner as to select the proper punch for operation to duplicate the perforations read at the transmitting end of the line, a different series of code impulses being assigned to each index point value of the card column.

A more specific object is to provide a novel arrangement of rotary contacts for accomplishing the foregoing objects together with means for synchronizing said contacts.

Various other objects and advantages or features of the present invention will be pointed out in the following specification and claims or will be apparent after a study of the accompanying drawings which show a preferred embodiment of said invention.

The present invention utilizes perforating apparatus substantially similar to that disclosed in Letters Patent No. 1,772,186, granted August 5, 1930 to F. L. Lee and B. F. Phillips. One of such machines will be used as a transmitter in the system embodying the present invention while a substantially identical machine will be used as a receiving apparatus, both being used in combination with synchronized contacts driven by motors operating synchronously. Only minor changes have been made in the mechanical construction shown in the cited patent while the electrical connections have been modified in both the transmitting machine and the receiving machine.

It should be noted herein that the perforating apparatus described in the cited patent will be utilized in the transmitter described herein solely for the purpose of making an analysis of the perforations in the master cards used to control the transmitter while the perforating apparatus utilized as a receiver will be used solely to reproduce in a duplicate card the perforations appearing in the master card, the card sensing and analyzing function of the perforator proper not being used in the receiver. In other words, the duplicating operation performed in a single machine in Patent No. 1,772,186 will be performed, according to the present invention, by means of two similar machines placed at a distance from each other, the data on the master card utilized to control the transmitter being duplicated upon a similar card in the receiver and at a point remote from the transmitter.

Since the mechanical construction of both the transmitter and the receiver is nearly identical it will be unnecessary to go into a lengthy description of both, indeed, only a very brief description will be given herein of the general construction of the perforator mechanisms as a whole since it is fully described in the cited patent. The general details of mechanical construction of the transmitter will now be briefly described herein and it will be understood that the same construction is present in the receiver. Any slight differences which may exist will be particularly pointed out at the proper time.

The master card is placed upon a card table in the transmitter and is arranged to be moved step-by-step past a series of analyzing brushes which sense the perforations in the card. The perforation present in any card column permits current to pass through the particular brush affected and, through other mechanism, a timed series of impulses or code signals are sent over a wire to the receiver wherein the impulses transmitted are decoded automatically and affect the operation of the receiver to an extent which results in a duplicate card being perforated in the same column and index position as in the master card.

Figure 1:
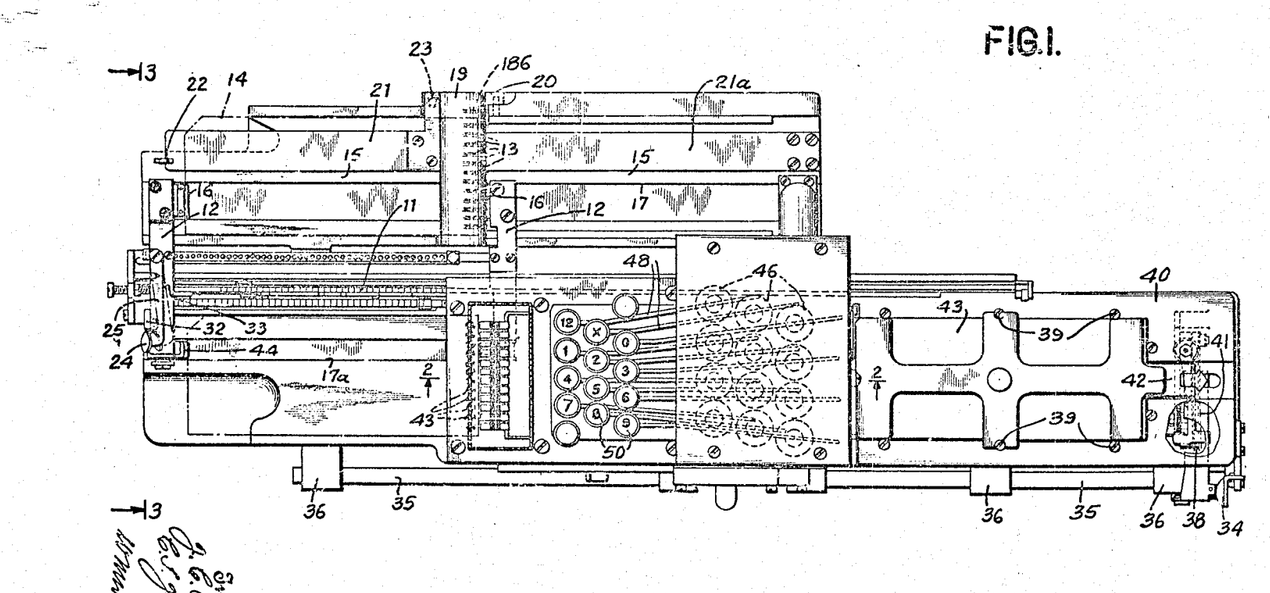
Fig. 1 is a top plan view of the transmitting or coding apparatus.

The mechanism for analyzing the master card comprises a card carriage consisting of a rack bar 11 carrying arms 12 arranged to propel the master card step by step from right to left (Fig. 1) past the analyzing brushes 13. Fig. 1 shows the carriage occupying its extreme left position which is its normal location ready to receive a master card. The master card 14, indicated in dot and dash lines in Fig. 1, is placed upon the surface of the master card table 15 between the arms 12 which are provided with blocks 16 arranged to slide within a groove 17 extending right and left (Fig. 1) in the master card table 15. Each of the blocks 16 is provided with a shoulder or projection slightly overlying the right and left edges of the master card for the purpose of holding the card in position as it moves over the card table and at the same time permitting its insertion or removal.

The brushes 13 are arranged beneath the master card table 15 and project through openings therein so as to bear upon the surface of an insulated contact roll 18 rotatably mounted within a casing 19 pivoted at 20 to a fixed part of the frame. The contact roll 18 is not shown in Fig. 1 but is shown diagrammatically in Fig. 10. In order to prevent the card from springing out from between retaining blocks 16, the housing 19 has integral therewith a narrow member 21 which is latched in place by means of a spring urged catch 22 pivoted in the main frame. A compression spring 23, shown in dotted lines in Fig. 1 and interposed between the main frame and a part of the housing 19, normally tends to force the member 21 upwardly. When the catch 22 is released the member 21 and housing 19 spring upwardly about 20 as a pivot and permit the insertion or removal of the master card. A similar strip 21a fastened to the right end of the card table 15 prevents warping or springing of the card when it occupies a position to the right of the housing 19 (Fig. 1).

Figure 3:
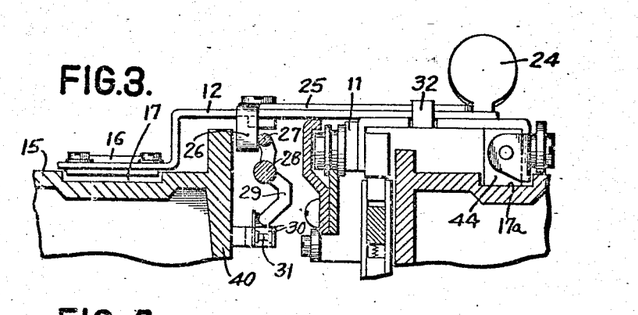
Fig. 3 is a vertical transverse section taken substantially on the line 3—3 of Fig. 1.

The card carriage is adapted to be moved manually to its extreme right position (Fig. 1) for the purpose of bringing the first column of the card under the brushes 13. This movement is accomplished by grasping a thumbpiece 24 of a thumb lever 25, pivoted upon the left arm 12 (Fig. 1), and moving the carriage to the right as far as it will go. The lever 25 is provided with a downwardly projecting lug 26 (Fig. 3) extending in the rear of a bail 27 carried upon a rod 28 pivoted in the main frame. The bail 27 has an arm 29 arranged to bear upon an insulating button carried by one of a pair of insulated contact members 30, the contacts 31 of which are normally closed. The lever 25 is spring urged toward the left (Fig. 1) and normally rests against a stop 32 formed in the arm 12. A stop 33, also carried by the arm 12, limits movement of lever 25 to the right. When the thumbpiece 24 is grasped and the carriage pressed toward the right, the arm 25 will be brought against the stop 33 and at the same time lug 26 will rock the bail 27 counterclockwise (Fig. 3) and open contacts 31, thereby breaking the circuit to the contact roll 18 and brushes 13. As soon as the thumb lever 24 is released after moving the carriage to the right the contacts 31 reclose.

If desired, other means may be utilized to move the card carriage to the right. This means comprises a thumb lever 34 (Fig. 1) which may be pressed toward the left and moves a rod slidably mounted within a tube 35 carried by brackets 36 attached to the main frame. The aforesaid rod is provided with gear teeth meshing with a pinion which, through a system of gears meshing with rack teeth 37 formed in the rack 11, draws the carriage to the right. A suitable clutch shifted by the initial movement of the rod is provided with inclined teeth so as to permit the return to original position of rod and thumb lever 34 without disturbing the card carriage. The initial movement of the thumb lever 34 causes the opening of a pair of normally closed contacts 38 arranged within the casing of the machine. These contacts remain open until the thumb lever 34 is returned to its normal position at the right (Fig. 1) and are connected in series with the contacts 31.

There is also provided a magazine adapted to hold a supply of blank record cards and comprises a number of vertical posts 39 screwed into the top surface of the machine casing or frame 40. An arm 41 attached to the rod carrying the thumb lever 34 carries a pivoted picker 42 which engages the right edge of the lowermost card of the stack 43 and moves the card to the left as the thumb lever 34 is moved to the left. This movement brings the card removed from the magazine into position with the first column thereof under a row of punches 43 in which position the left edge (Fig. 2) of the card will engage the left arm 12 which carries a block 44 similar to the blocks 16, while the right edge of the card will be against a pivoted push finger 45 carried by the right arm 12. The push finger 45 and block 44 slide in a groove 17a similar to the groove 17. It will be seen, therefore, that a movement of thumb lever 34 to the left (Fig. 1) will not only move the card carriage and the master card 14 to the right but will also feed a blank card into position to be punched in the first column.

This construction makes it possible to punch a verification card in the transmitter simultaneously with the punching of the duplicate card in the receiver. When it is not desired to punch such a verification card the left thumb lever 24 will be used to move the carriage to the right ready for an analyzing operation.

The brushes 13 in the transmitter are connected in series with magnets 46, hereinafter to be termed punch selecting magnets since they control the selection of the punches and associated mechanism. Each of the magnets 46 is provided with an armature 47 (Fig. 2) mounted upon a lever 48 which is pivoted at 49 to the main frame. The other ends of levers 48 (Fig. 2) have a pivotal connection with depressible keys 50 through the medium of recesses formed in the key stems. Each key 50 is provided with a punch interposer 51 arranged to be moved to the left (Fig. 2) whenever a key is depressed either manually or by the energization of the related magnet 46.

This movement is accomplished by means of bell cranks 52 pivoted in uprights 53 which are supported by a plate 54 guiding the key stems. Each bell crank 52 has a pivotal connection 55 to its associated key stem and also has a pin and slot connection 56 with its related interposer.

Each of the interposers 51 is normally restrained by a spring 57 interposed between a block integral with the interposer and a fixed part of the frame and is provided with a cut-away portion 58 underlying a bar 59 carried by a depressor plate 60. The depressor plate 60 is pivoted at 61 to the main frame and is spring urged upwardly by a coil spring 62. The bar 59 overlies the cutaway portions 60 of all of the interposer bars and is pivotally connected to a link 63 (Fig. 4) which in turn is pivoted to one arm of a bell crank 64 journaled in the main frame. The other arm of the bell crank 64 is pivoted to the armature 65 of a magnet 66 by means of a link 67. The magnet 66 will be referred to hereinafter as the punch magnet.

The left end of each of the interposers 51 (Fig. 2) rests upon the head of one of the punches 43 each of which is normally held up against the ends of the interposers by a spring 68. It will be clear that movement of any interposer 51 to the left (Fig. 2) will establish an operative relation between the depressor plate 60 and the punch corresponding to the selected interposer so that subsequent energization of magnet 66 will bring about a depression of the depressor plate 60, the end of the selected interposer, and the selected punch 43 with the result that a card under the punches 43 will be perforated at the index point corresponding to the punch selecting magnet energized. In other words, if the "9" key is depressed either by hand or owing to a brush 13 encountering a perforation at "9" in the master card, the punch corresponding to the "9" index position will perforate the card under the punches 43 in the "9" index position, the perforation in the latter case occurring in the same column in the duplicate card as in the master card.

All of the foregoing mechanisms are fully shown and described in Patent No. 1,772,186 and for a more detailed description reference may be had thereto.

Figure 2:
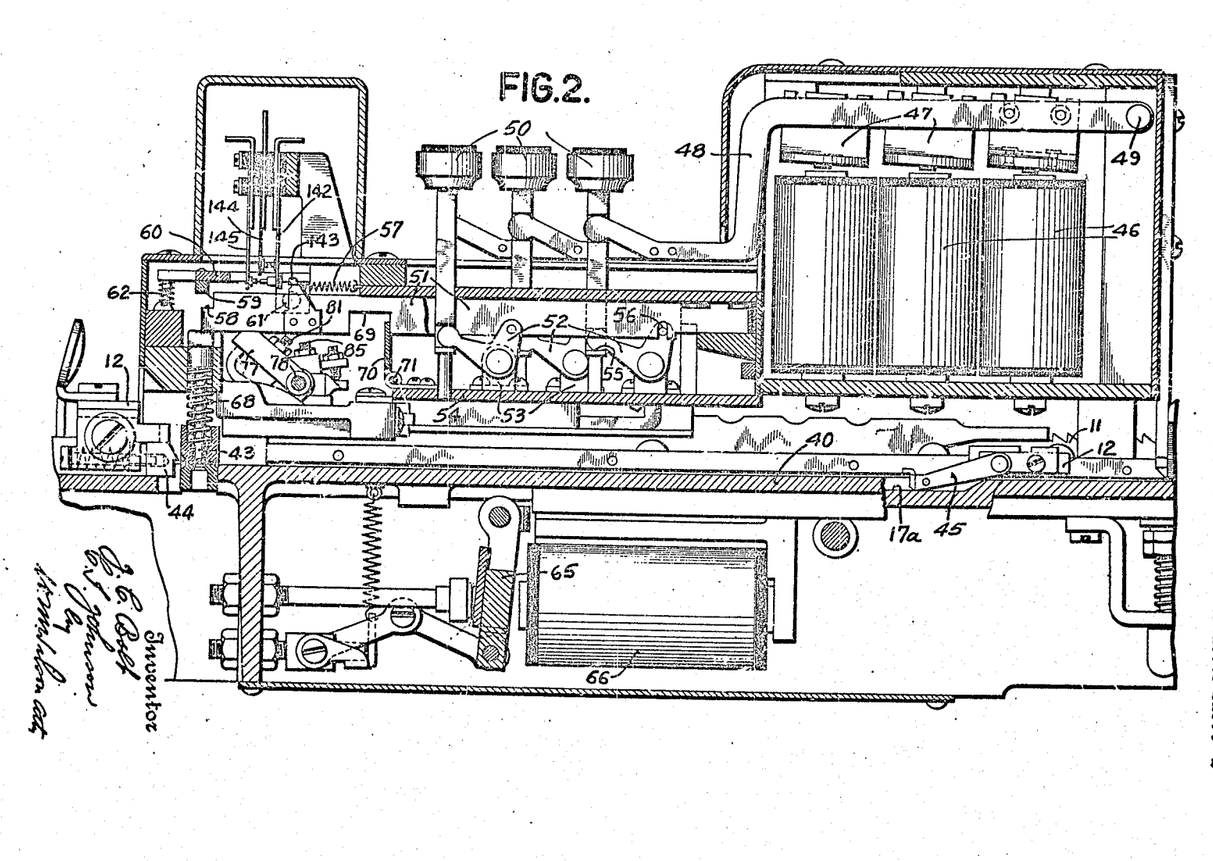
Fig. 2 is a vertical longitudinal section taken on the line 2—2 of Fig. 1.
Figures 4, 6:
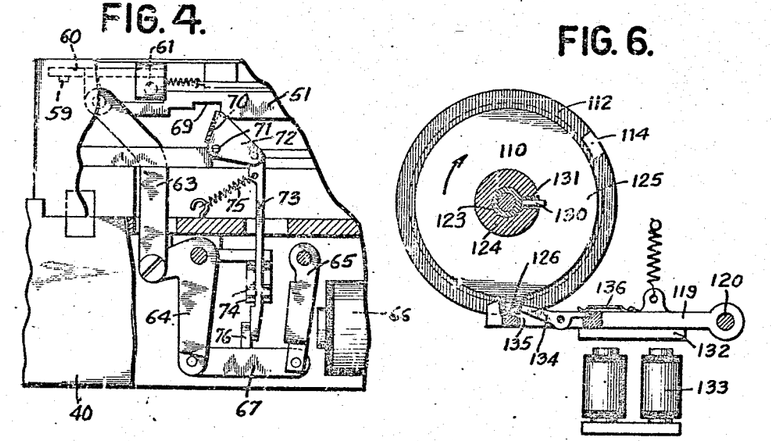
Fig. 4 is a vertical section illustrating the construction of the means for operating the punch magnet contact.
Fig. 6 is a vertical transverse section taken on the line 6—6 of Fig. 5.

Advantage is taken of the movement of the interposer bars whenever a key 50 is depressed to close a pair of contacts. Each interposer 51 is provided with a cut-away portion 69 against the right wall of which bears a plate 70 spring urged to the right (Figs. 2 and 4). The plate 70 is fast on a shaft 71 underlying the interposers and pivoted in the main frame and has an arm 72 extending at right angles to the plate and downwardly toward the right (Fig. 4). A hook or latch 73 is pivoted to the arm 72 and at its lower end hooks over the underside of the lowermost contact of two normally open spring contacts 74, a spring 75 normally holding the hook of the latch 73 in engagement with the lower contact. It will be clear, therefore, that the contacts 74 will be closed by the latch 73 whenever any interposer 51 moves to the left (Figs. 2 and 4) and will remain closed until the latch 73 becomes disengaged. The link 67 carries a tripping member 76 fast thereto which has a bent over lug adapted to engage the lower end of latch 73 and disengage the latch from the lower contact member 74 whenever the armature 65 is attracted by magnet 66, the disengagement taking place near the end of the stroke of the link and armature. It will be seen that contacts 74 will be closed just before the punching operation is effected and that they will be opened just at the end of the stroke of the selected punch. The purpose of the contacts 74 will be more completely described later herein.

No mention has been made hereinbefore of the means for advancing the carriage column by column from right to left (Figs. 1 and 2) after the master card has been inserted and the carriage moved to the right preparatory to perforating one or more duplicate cards. The escapement mechanism for producing step-by-step movement of the carriage is substantially the same as in Letters Patent No. 1,266,768 granted May 21, 1918, to G. B. Buck and No. 1,426,223 granted August 15, 1922, to J. T. Schaaff, with modifications and an added function. For convenience a brief description will now be given for sake of completeness.

Figure 7:
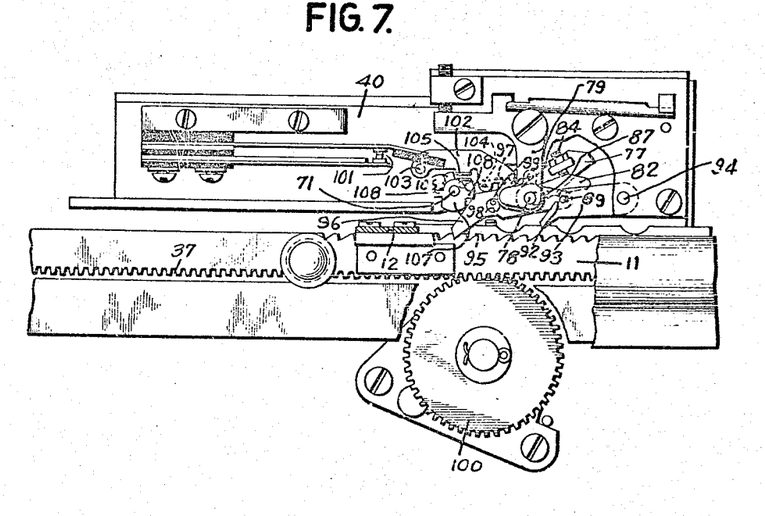
Fig. 7 is an elevation showing the construction of the escapement mechanism and the duplicating magnet circuit breaker contacts viewed from the rear of the transmitter.
Figure 8:
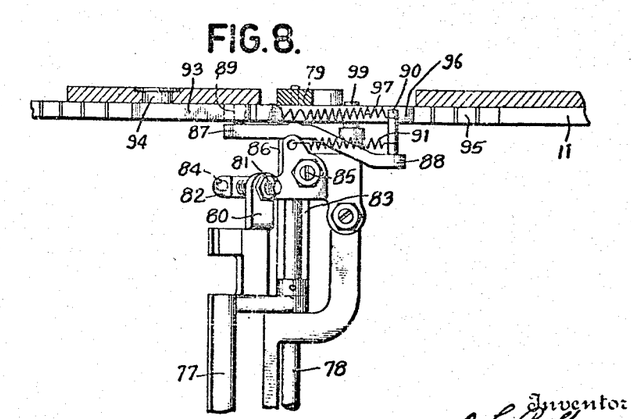
Fig. 8 is a top plan view of the escapement mechanism.

The escapement mechanism, illustrated in detail in Figs. 7 and 8, is controlled by a bail 77 underlying the left ends (Fig. 2) of all of the interposers 51. The bail 77 is loosely mounted upon shaft 78, journaled at its rear end (Fig. 8) in a bracket 79 adjustably mounted in the main frame 40 and at its front end in a fixed part of the frame. A lug 80, integral with bail 77, carries an adjusting screw 81 bearing upon a lug 82 forming part of a member 83 fastened to shaft 78. A spring 84 interposed between the underside of lug 82 (Fig. 8) and a fixed part of the frame normally holds the member 83 in position with lug 82 in contact with the adjusting screw 81 and thereby also holding the bail 77 in contact with the lower edges of the interposers.

The member 83 carries an adjusting screw 85 which bears upon a shoulder formed in a member 86 loosely mounted upon shaft 78, the shoulder being just below the adjusting screw 85 and to the right of shaft 78 as viewed in Fig. 8. The member 86 has two arms 87, 88 extending to the left and right, respectively, of shaft 78 which bear pins 89, 90. A spring 91, interposed between an ear carried by member 83 and the pin 90, holds the shoulder in member 86 constantly in contact with the adjusting screw 85 so that members 83 and 86 move as one whenever bail 77 is rocked.

The pin 89 rests in a slot 92 formed in an escape dog 93 which is pivoted at 94 to the main frame. The dog 93 normally just clears the rack 11 and is adapted to be rocked downwardly (Fig. 7) into engagement with the escapement teeth 95 formed in rack bar 11 whenever the bail 77 is rocked downwardly or counterclockwise, as viewed in Fig. 2. A locking dog 96, loosely pivoted upon shaft 78, normally engages one of the teeth 95 of the rack 11 and is held in contact thereto by a spring 97 connected to an ear formed in the dog and to pin 91. The dog 96 is slotted slightly at the point where it is pivoted to shaft 78 and is capable of a slight degree of longitudinal movement to the left (Fig. 7) whenever it is disengaged owing to the slotted connection with shaft 78 and is also provided with a large opening 98 into which projects a pin 99 carried by member 83.

Normally, when the card carriage is at rest, the dog 93 just clears the teeth 95 of rack bar 11 while the dog 96 engages one of the teeth 95 and holds the carriage stationary against the tension of a spring motor 100 which is geared to the rack 37 and tends to urge the carriage constantly to the left as shown in Figs. 1, 2 and 8, or to the right as shown in Fig. 7. Whenever any interposer 51 is moved to the left (Fig. 2) by the manual depression of a key 50 or by the energization of the associated punch selecting magnet 46, the left end of the interposer establishes an operative relation between the depressor plate 60 and the punch 43 associated with that interposer, therefore, when the punch magnet 66 is subsequently energized, both depressor plate 60, the left end of the interposer 51 selected, and the associated punch 43 will be depressed thereby pressing down on the top of the bail 77, rocking the bail clockwise as in Fig. 7 or counterclockwise as in Fig. 2. As a consequence of such movement of bail 77, the pin 89 will be depressed and pin 99 raised so that the dog 93 will be lowered into engagement with one of the teeth 95 while the dog 96 will be disengaged therefrom. The dogs are so adjusted that the dog 93 engages teeth 95 and holds the rack from movement before the dog 96 clears the particular tooth 95 it happens to be engaging. As soon as dog 90 clears the tooth 95 the spring 97 draws it to the left (Fig. 7) a slight amount owing to the slotted connection of the dog with the shaft 78, and, as a result, the end of the dog 96 rests on top of the tooth it formerly butted against. The parts remain in this position as long as the magnet is energized.

When the magnet 66 is eventually de-magnetized it releases its armature 65 and permits the depressor plate 60 to rock back to its normal position whereupon spring 84 forces bail 77 back to its original position, lifting dog 93 out of engagement with the tooth 95 thereby releasing the rack 11 which will now be permitted to move one tooth.

The end of dog 96, since it is resting upon the top of a tooth 95, will slip into the space between the tooth 95 it originally engaged and abut the next adjacent tooth 95 to the left (Fig. 7) ready for a perforating operation in the next column on the record card. The parts are so adjusted that the dog 93 holds the rack 11 until the bail 77 has very nearly returned to its normal position with the selected interposer almost fully restored by its associated spring. It is clear from the foregoing that the card carriage is prevented from escaping one tooth distance or card column until the punching operation has been completed and the punch completely withdrawn from the perforation in the card.

The operation of the escapement dog 96 is utilized to open and re-close a pair of normally closed contacts 101 mounted upon the main frame 40. A member 102, loosely mounted upon the shaft 98, has a pin 103 arranged to open the contacts 101 whenever the member 102 is rocked clockwise (Fig. 7) a sufficient distance. A bent-over lug 104, formed in member 102, overlies the dog 96 and it will be clear that member 102 will be raised and contacts 101 opened whenever the dog 96 is raised by the action of pin 99. The member 102 has a second bent-over lug 105 projecting into the plane of a member 106, hereinafter to be termed the floating cam, which is loosely mounted upon shaft 71 adjacent a member 107 rigid with said shaft. The member 107 has two lugs 108 projecting right and left respectively (Fig. 7), the right lug being engaged by a bent-over lug formed in the floating cam 106 while a torison spring coiled about shaft 71 and interposed between the left lug 108 and the floating cam 106 normally holds the bent-over lug on the cam 106 in contact with the right lug 108.

The operation of the foregoing parts is as follows: When a selected interposer 51 is moved to the left (Fig. 2) the plate 70 and shaft 71 will be rocked counterclockwise as viewed in Fig. 2, or clockwise as viewed in Fig. 7. As a consequence the torison spring carried by shaft 71 will be tensioned and the right edge of the floating cam 106 will be pressed against the lug 105 in member 102. The parts so far mentioned will remain in this position until the member 102 is raised by the dog 96 in the manner already described thereby opening contacts 101 whereupon the lug 105 will be removed from the path of the floating cam 106 which will snap under the lug 105 and consequently prevents the contacts 101 from being reclosed until the shaft 71 is rocked back to normal position. When the selected interposer 51 is completely restored the shaft 71 will be rocked back to normal and the floating cam 106 removed from beneath the lug 105 thereby permitting the contacts 101 to reclose.

The foregoing mechanism is fully shown and described in application Serial No. 391,874, filed September 11, 1929 by Fred Lee and G. F. Daly to which reference may be made for a more detailed description. It will be sufficient to mention that the contacts 101 are inserted in the circuit to the punch selecting magnets 46 to prevent operation of any of said magnets until the previously operated interposer has been completely restored. After the last column of the card has been sensed and perforated the dog 96 rests upon the top of the rack 11 which has no teeth beyond the 45th column so that the circuit to the magnets 46 remains interrupted until a new master card is placed in the carriage and the carriage shifted to the right as before.

The mechanism so far described concerns the general construction of both the transmitting apparatus and the receiving apparatus. Since the receiving apparatus is practically identical in mechanical construction it will not be necessary to go into great detail herein regarding its construction. It is sufficient to say that magnets 46a similar to magnets 46 control the selection of the desired punch, the operation of punching being effected by a punch magnet 66a identical with the magnet 66. A similar card carriage escapement is provided and a pair of contacts 101a similar to the contacts 101 are also controlled by the receiver escapement. The receiving mechanism is not provided with analyzing brushes similar to the brushes 13 since they are not necessary. The magnet 66a in the receiver is controlled by means of contacts 74a similar to contacts 74 of the transmitter and is arranged to effect a punching operation whenever the contacts 74a are closed by the leftward movement of a selected interposer 51a under the influence of its associated punch selecting magnet 46a. The selection of the magnet 46a is effected by means of a number of relays which are combinationally controlled by a cyclically operable commutator device or rotary contact member associated with the receiver and controlled by a substantially similar commutator device or contact member associated with the transmitter. The two commutator devices are each driven by synchronized motors and are arranged to be set in motion and synchronized in a manner presently to be described.

The receiver is provided with right and left thumb lever contacts 38a and 31a, respectively, identical with the contacts 38, 31, hereinbefore described and operated in the same manner. The contacts 31a and 38a are connected in series with the contacts 101a and magnets 46a and it will be clear, therefore, that the receiver, like the transmitter, cannot be operated to perforate cards until the card carriage has been properly positioned nor can it be operated inadvertently while the thumb levers are being manipulated to feed a card into position ready to be perforated.

Each commutator device is driven by a motor 109, both motors being preferably of the same electrical characteristics so that both may be operated in exact synchronism. The motors 109 may be of the alternating synchronous type and operated from a separate source of power or they may be of the direct current constant speed type and operated from the same source of power as the transmitter and receiver, respectively. The commutator device associated with the transmitter is carried upon an extension 110 of the motor shaft and consists of a hub 111 loosely mounted on said shaft and bearing an insulated disk 112. The disk 112 carries a continuous contact 113 having a portion 114 which extends to one side and is adapted to serve as a moving contact cooperating with certain brushes in a manner to be described hereinafter. A brush 115 normally bears upon the continuous contact 113 and is connected to the line wire 116 connecting together the receiver and transmitter. The commutator device associated with the receiver includes a disk 112a similar to disk 112 and is provided with a similar continuous contact 113a and brush 115a coacting therewith, also connected to the line 116. The contact 113a likewise has a wide portion 114a (indicated diagrammatically in Fig. 10).

Figure 5:
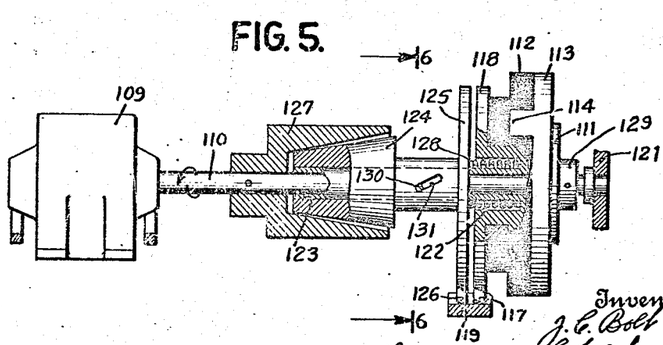
Fig. 5 is an elevation, partly in section, illustrating the construction of one of the synchronous commutator devices.

Normally both the commutator disks are stationary with the wide portions 114, 114a in contact with certain brushes, to be mentioned later, in both transmitter and receiver, respectively, and are arranged to be released simultaneously at certain times to permit both disks to rotate in synchronism. The disk 112 is normally held against rotation by means of a lug 117 extending radially from a disk 118 integral with the hub 111 and engaged by a hooked latch 119 pivoted at 120 to a frame supporting the motor 109 and an outboard bearing 121. The hub 111 is provided with an annular recess 122 and also has a tubular extension 123 supporting a clutch member 124 having a disk portion 125 similar to the disk 118 and similarly provided with a lug 126 identical with the lug 117. The lug 126 is also held by the latch 119 so that the entire mechanism including the disk 112, hub 111 and its disk 118, clutch member 124 and its disk 125 are held against rotation in the direction of the arrows (Figs. 5 and 6).

The clutch member 124 is adapted to be moved into engagement with a mating clutch member 127, rigidly mounted upon shaft 110, under the influence of a spring 128 contained within the recess 122 and normally tending to separate the two disks 118 and 125. A collar 129, integrally mounted upon shaft 110, prevents any movement of disk 118 to the right (Fig. 5) while a pin 130, carried by extension 123 and projecting through an inclined slot 131 in clutch member 124, prevents movement of disk 125 to the left, since the shape of the slot 131 is such that the spring 128 tends to turn the disk 125 in the direction of the arrows (Figs. 5 and 6) with respect to the extension 123. Such movement is prevented owing to the engagement of the latch 119 with the lug 126 so that the entire commutator device is prevented from being rotated.

The motor 109 is constantly rotating in the direction of the arrows (Figs. 5 and 6) and consequently there is always a certain tendency for the parts to turn in the same direction owing to the friction between the shaft 110 and the hub 111 with its extension 123 and also between said hub and the collar 129, such movement being prevented as aforesaid by the latch 119. The operation of these parts will now be described.

The latch 119 is provided with an armature 132 coacting with a magnet 133 hereinafter to be called the clutch magnet and it will be clear that energization of the magnet will withdraw the latch thereby releasing the two disks 118, 125. When the latch 119 is released the spring 128 is no longer restrained and, as a consequence thereof, the disk 125 will be forced to the left (Fig. 6) bringing the clutch member 124 into engagement with the clutch member 127, the pin and slot construction causing the clutch member 124 to travel to the left with a slight spiral motion with respect to extension 123 thereby moving the lug 126 slightly in advance of the lug 117 in the direction of motion of the motor as indicated by the arrows (Figs. 5 and 6). The entire mechanism carried by the shaft 110 will now be clutched to the shaft and as a consequence the commutator disk 112 will be positively driven by the motor 109.

The clutch magnet 113 will be immediately deenergized as will be explained later herein and will release the latch 119 which will rest upon the disks 118, 125. After one revolution of the disk 112 has been completed the lug 126 will strike the hooked part of the latch 119 slightly before the lug 117 strikes said latch and will be prevented from further movement. As a consequence the disk 125 will be held and the friction between the collar 129 and hub 111 and between extension 123 and shaft 110 will force the pin 130 back to its former position, this movement being very materially assisted by the inertia of the disk 112, thereby bringing both disks 118, 125 to rest with their lugs 117, 126 in engagement with the hooked portion of latch 119 ready for a subsequent repetition of cycle.

Each of the disks 118, 125 has a coacting pawl 134 pivotally mounted in a recess 135 in the latch 119, each pawl being pressed upwardly into engagement with the rear or right edge of the respective lug 117 or 126 (Fig. 6) by means of a spring 136 attached to the latch 119 and holding the tail of the pawl against a shoulder formed in the recess 135. It will be obvious that each pawl 134 will snap behind the lug 117 or 126 of its associated disk 118 or 125 as soon as the disk arrives at its home position thereby preventing any likelihood of either of the disks to bounce backwardly after striking the hooked portion of latch 119.

The mechanism for controlling the connection of the disk 112a to its driving mechanism is identical in construction and mode of operation to the mechanism already described for controlling the disk 112 and is controlled by a clutch magnet 133a similar to magnet 133, consequently a detailed description of the former mechanism will not be necessary herein.

The clutch magnet 133 associated with the disk 112 is connected in series with the thumb lever contacts 31, 38 to the line 137, leading from one terminal of a source of power 138, and is also connected in series with the contacts 74 and to a brush 139 which normally rests upon the contact 114 when the disk 112 is at rest in its home position. It will be seen, therefore, that the clutch magnet 133 can only be energized when the contacts 74 are closed by the shifting of any of the interposers 51 to the left (Fig. 2) and then only when both contacts 31, 38 are closed. The clutch magnet 133a, controlling the connection of disk 112a to its driving motor, is likewise connected to a brush 139a similar to brush 9, and to a common ground wire 140a in the receiving apparatus. It will be clear, therefore, that closure of contacts 74 by the movement of a selected interposer 51 will energize both clutch magnets 133, 133a through a circuit as follows: Source 138, line 137, normally closed contacts 38, and 31, clutch magnet 133, brush 139, contacts 114 and 113, brush 115, line 116, brush 115a in the receiver, contacts 113a and 114a, brush 139a, clutch magnet 133a, to the common ground wire 140a, back to the source 138 through the ground.

Both magnets 133 and 133a will release their disks 112, 112a which will become connected to their driving motors. The result will be that the contacts 114 and 114a will rotate in synchronism in the direction of the arrows in Fig. 10.

The contact 114 is adapted to produce timed electrical impulses or code signals in the line 16 according to a predetermined arrangement, a definite series or group of impulses being produced during each cycle of operation of the disk 112 and corresponding to the particular perforation present in an index point of the column being sensed on the master card by the brushes 13. In other words, there is a differently timed group of impulses possible for each of the twelve index points in the card column. When a card having 45 columns and a perforation in every column is to be duplicated in the receiver it is necessary to transmit in succession 45 groups of timed impulses over the line 16, each group being translated or decoded in the receiver into a perforation in the duplicate card, every perforation in the master card being reproduced as a perforation in the corresponding card column of the duplicate card and in the corresponding index position. Thus, to reproduce the perforations in a 45 column card, it is necessary for the system to pass through 45 cycles of operation, each cycle representing a perforation and comprising a series of timed impulses which differ in timing for each particular index position of the column in which a perforation is encountered by the brushes 13 analyzing the master card.

The mechanism for accomplishing the foregoing result comprises coding contacts which are closed by the movement of an interposer 51 to the left (Fig. 2) and which are connected in predetermined combinations to a The relays mentioned in the preceding paragraph are mounted to the left of the magnet 66a (Fig. 9) and are provided with armatures 169, loosely mounted upon a cross rod 170, and spring urged downwardly. Associated with each armature 169 is a latch 171 loosely mounted upon a cross rod 172. A spring 173 normally holds each latch with the nose of the hooked portion thereof in contact with the left end of the associated armature 169 which is beveled at its free end. Each armature 169 has an insulated post 174 pressing down upon a spring contact member 175 which is flexed downwardly owing to the combined effect of the weight of the latch and the springs cooperating therewith.

Figure 9:
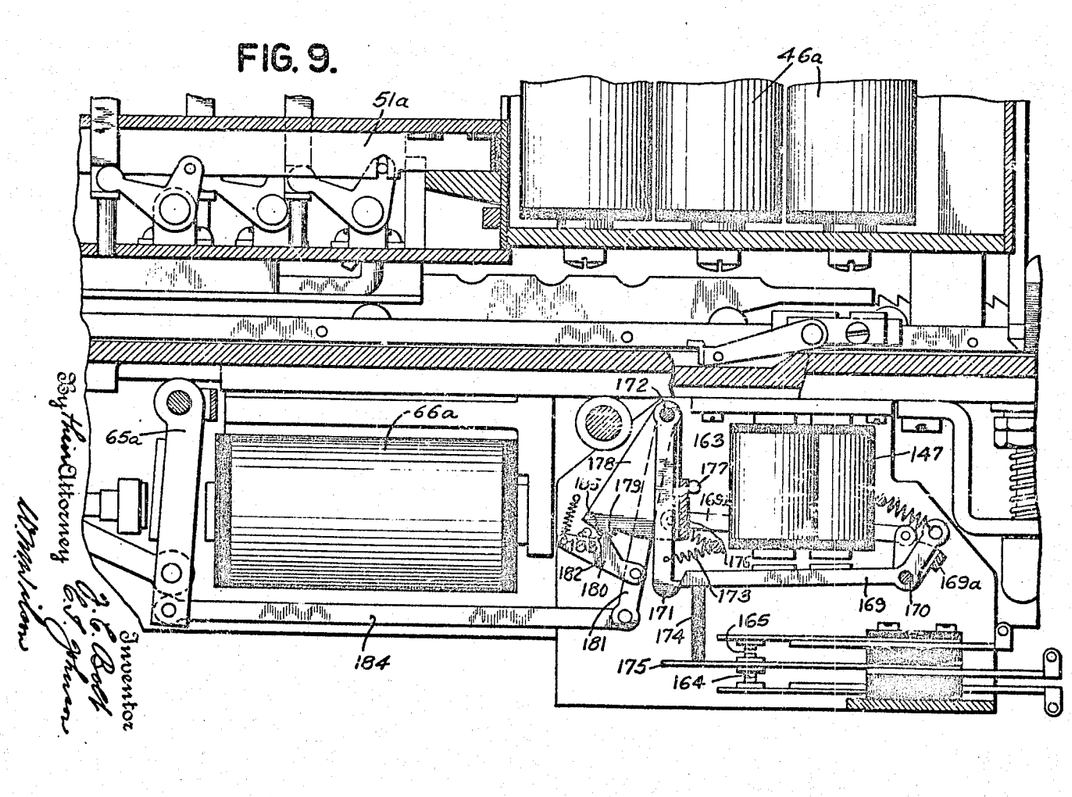
Fig. 9 is a view somewhat similar to Fig. 2 but less extensive and illustrates the construction of a portion of the receiving or decoding apparatus.

There are nine magnets and nine latches 169 provided, eight of the latches being arranged to close normally open contacts similar to contacts 165 (Fig. 9) while the ninth latch, actuated by relay magnet 163 in the figure, has a second pair of normally closed contacts 164 arranged to be opened whenever the latch 169 associated therewith is attracted by magnet 163. The relay magnet 163 is illustrated in Fig. 9, only one of the magnets similar to magnet 147 for opening contacts 150 being shown. It will be understood that actuation of relay magnet 163 effects opening of contacts 164 and closure of contacts 165, while the actuation of magnet 147 will effect closure of contacts 150 similar to contacts 165. All of the remaining magnets 148, 149, and 153 to 157, inclusive, function in a manner similar to magnet 147 and have contacts 151, 152 and 158 to 162, inclusive, similar to contacts 165.

Each armature 169 when attracted by its correlated magnet is retained in operated position by the associated latch 171 which must be released after the punch magnet 66a has effected the perforation of the card before a subsequent perforating cycle may be initiated. Unlatching of the operated latches 171 is effected by means of a bail 176, loosely mounted upon shaft 172 and extending from front to rear of the machine to the left of all of the latches 171, adapted when rocked to the left (Fig. 2) to engage any of the operated latches and detach them from their associated armatures 169 thereby permitting the armatures to drop back to their normal or unoperated position. The bail 176 is normally spring held against a stop 177 carried by the frame and is sufficiently removed from contact with the latches 171 to permit them to be drawn to latching position by springs 173. The rear arm supporting the bail 176 has a sector shaped portion 178 having a shoulder 179 formed on the outer edge and arranged to cooperate with a spring urged latch 180 pivoted upon an arm 181.

The latch 180 has an inclined cam surface 182 normally held in contact with a pin 183 carried by the main frame. The arm 181 is connected to the punch magnet armature 65a by means of a link 184 and it will be clear that the arm 181 will be rocked whenever the armature 65a is rocked under the influence of magnet 66a. The operation of the foregoing mechanism will now be described.

When the punch magnet 66a attracts its armature 65a, the link 184 will be carried to the right (Fig. 9) rocking arm 181 to the right and drawing the latch 180 therewith. At about the limit of such rightward movement an abutment 185 formed in latch 180 will drop behind the shoulder 179. As soon as the armature 65a is released and returns to normal position the arm 181 will be rocked to the left and the abutment 185 will engage the shoulder 179 thereby rocking the sector 178 and bail 176 to the left. The bail 176 will engage the latches 171 and rock them slightly to the left thereby releasing any of the armatures 169 which may have been latched up. When the abutment 185 drops behind the shoulder 179 the cam surface 182 is brought into contact with the pin 183 so that the movement of arm 181 to the left, previously described, will also effect a gradual withdrawal of the abutment 185 from contact with shoulder 179. The cam surface 182 is so proportioned that the abutment 185 will become completely withdrawn shortly before the armature 65a reaches its normal position and as a consequence the sector plate 178 will be released permitting the bail 176 to snap back against stop 177 under the influence of its spring.

In order to insure that none of the armatures 169 will be retained in operated position by the residual magnetism of the associated magnet, there is provided a positive knock-off comprising a bail 169a operated by a link 169b pivoted to the bail 178. When the bail 178 has been moved far enough to the left to unhook the latches 171 from the armatures 169 the bail 169a will engage the arms of the operated armatures 169 and force them away from the poles of the magnets.

The specific construction and operation of the separate mechanisms comprising the system have been described in detail, therefore, a complete description of the system as a whole will now be given. It will be presumed that the master cards have been preliminarily punched according to the desired data and that a perforation occurs in every column in the card. Before commencing the duplication of a master card the operator of the receiver will operate the right thumb lever of the receiver to feed a blank card from the card magazine into position with the first column thereof under the punches.

The master card is placed by the operator at the transmitter upon the card table 15 of the transmitter by releasing the latch 22 and raising the member 21 which permits slipping the card into place between the arms 12 with series of six brushes cooperating with the moving contact 114. Associated with each interposer 51 is a common contact member 141 connected to a common wire 142 which is connected to the wire 137 leading from the source of power 138. Each contact member 141 is engaged by a projection 143 carried by the associated interposer 51, the projection 143 being adapted to engage an insulating button on the lower end of the contact member 141 and press the contact member into contact with both members of a pair of insulated contacts 144, 145 mounted to the left (Fig. 2) of the member 141 thereby connecting the common wire 142 to both of the contacts 144, 145.

The contacts 144, 145 are connected combinationally and according to a definite plan to a group of wires A, B, C, D, E, and F, each of the said wires being connected to a series of six brushes 146 equally spaced and arranged to be connected successively to the line 116 by means of the contact 114 as it rotates in the direction of the arrow, the brushes 146 normally resting upon the insulated portion of disk 112.

Figure 10:
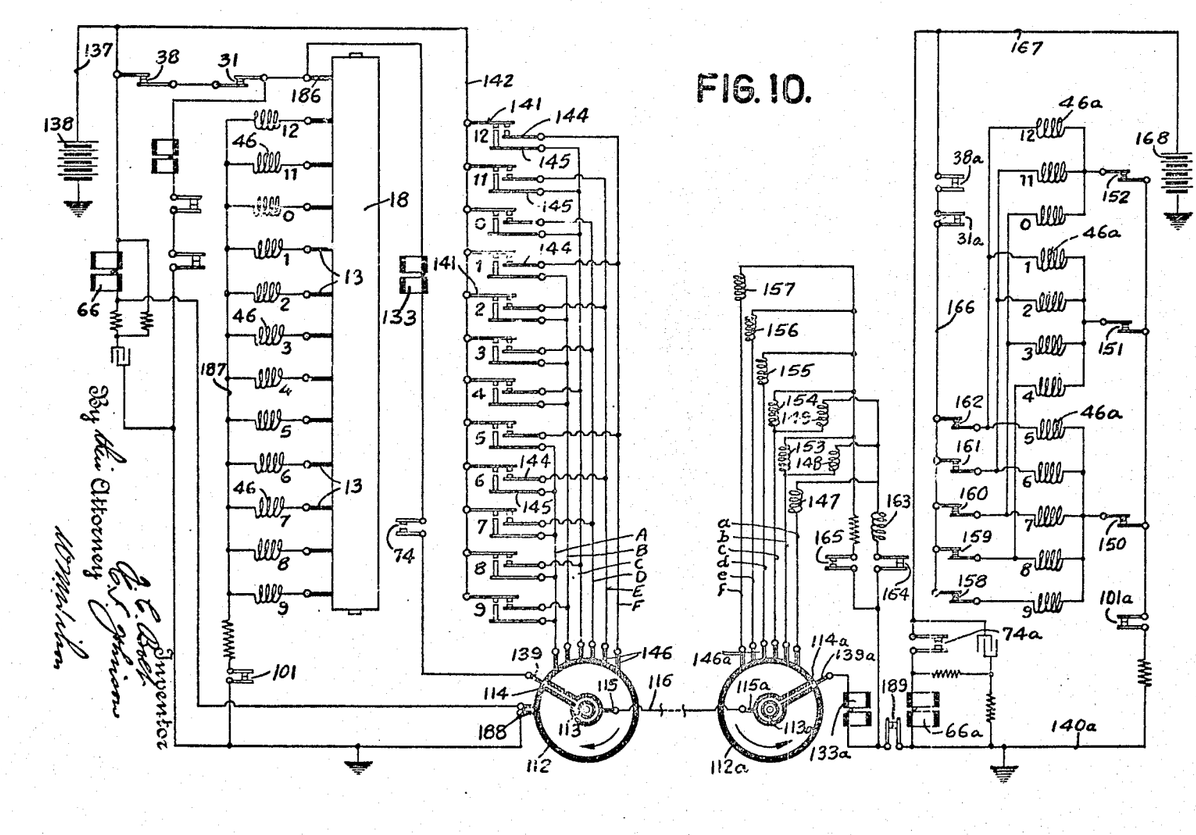
Fig. 10 is a circuit diagram showing the connections of the various apparatus in the complete transmitting and receiving system.

It will be noted from an inspection of Fig. 10 that the lower five pairs of contacts 144, 145, correspond to the index positions "5" to "9" inclusive, and to the corresponding punch selecting magnets 46. Of the foregoing group the contacts 145 have a common connection to the "A" wire while the contacts 144 are connected progressively to the "B" to "F" wires inclusive, beginning with the pair associated with the "9" and proceeding upwardly. The contacts 145 associated with the index positions "1" to "4" inclusive have a common connection to the "B" wire while the contacts 144 thereof have progressive connections to the "C" to "F" wires, respectively, beginning with the contacts associated with the "4" index position. Similarly the contacts 145 associated with the "0", "11", and "12" index positions have a common connection to the "C" wire and progressive connections to the "D", "E", and "F" wires. It will be clear from the foregoing that the movement to the left (Fig. 2) of any interposer 51 will connect a pair of the brushes 146 to the source 138 so that the particular pair of brushes selected will be made live electrically while the others will remain dead.

The contact 114a associated with the disk 112a of the receiver has a cooperating set of six brushes 146a identical in arrangement to the brushes 146 and disposed so that the contacts 114 and 114a will contact simultaneously and successively with corresponding brushes 146 and 146a as the contacts rotate. A group of six wires "a" to "f" inclusive are connected to the brushes 146a in correspondence with the wires "A" to "F" inclusive so that the "A" and "a" wires, for instance, may both be connected simultaneously to the line 16 by the synchronously rotating contacts 146 and 146a.

The wires "a" to "c" inclusive are connected to relay magnets 147, 148 and 149 which are arranged to open contacts 150, 151 and 152, respectively, whenever the associated relay magnets are energized. The wires "b" to "f" inclusive are connected to similar relay magnets 153 to 157, inclusive, similarly arranged to open contacts 158 to 162. The relay magnets 147 to 149 have a common connection to a relay magnet 163 in series with a pair of normally closed contacts 164 connected to the common ground wire 140a while the relay magnets 153 to 157 have a common connection in series with a resistance and a pair of normally open contacts 165 also connected to the common ground wire 140a. The contacts 164 and 165 are controlled by the relay magnet 163 in such a manner that normally closed contact 164 is opened and normally open contact 165 is closed whenever the magnet 163 is energized.

The punch selecting magnets 46a associated with the "5" to "9" index positions, respectively, have a common connection in series with the contacts 150 and each magnet is in series individually with one of the contacts 158 to 162, inclusive. A common wire 166 connects the contacts 158 to 162 in series with right and left thumb lever contacts 38a to 31a to a line 167 leading to one terminal of a source of power 168 local to the receiver. The magnets 46a associated with the "1" to "4" index positions have a common connection in series with contacts 151 and are individually in series with the contacts 159 to 162, inclusive.

Similarly the magnets 46a associated with the "0", "11", and "12" index positions have a common connection in series with contacts 152 and are individually connected to the contacts 160 to 162, inclusive. The contacts 150 to 151 have a common connection in series with the contacts 101a to the common ground wire 140a. The punch magnet 66a of the receiver is connected in series with contacts 74a between the line wire 167 and ground wire 140a, the usual condenser and resistance being provided to prevent the contacts 74a from sparking excessively.

It has been mentioned that relay magnets 147 to 149, 153 to 157, and relay magnet 163, all inclusive, are arranged to open certain contacts associated therewith, the relay 163 also closing contacts, whenever they are energized. The contacts once closed by energization of the associated relay magnets remain closed until the hole is punched in the duplicate card after which they must be reopened before the next cycle begins. Advantage is taken of the operation of the punch magnet 66a to reopen the contacts through mechanism operated by the release of the punch magnet armature 65a (Fig. 9).

the shoulders on the blocks 16 overlying the ends of the card. The member 21 is relatched in normal position, the thumb lever 24 grasped and the card carriage shifted to the right as far as it will go. This operation brings the first column of the card under the brushes 13. While the card carriage is being shifted in this manner the contacts 31 remain open so that no current can pass through the transmitter circuit. As soon as the thumb lever 24 is released the contacts 31 reclose thereby establishing a circuit to the common contact roll brush 186. The operator at the receiver will also operate the right thumb lever of the receiver to feed a blank card out of the magazine into position ready for the duplicating operation.

Assuming that a perforation appears at the "6" index position in the first column of the master card, a circuit will be established as follows: source 138, line 137, contacts 38, 31, now closed, brush 186, contact roll 18, brush 13, corresponding to the "6" index position, punch selecting magnet 46 corresponding with the "6" index position, common return wire 187, contacts 161, now closed, to ground and back to source 138. The energization of magnet 46 moves its interposer 51 to the left (Fig. 2) thereby effecting closure of contacts 74 and operatively connecting the punch 43 in the "6" index position to the depressor plate and at the same time connecting contacts 144, 145, associated with the operated interposer, to the wire 142 through contact 141. This operation makes the "A" and "E" wires and their associated brushes 146 live while the other wires B to D and F remain dead electrically.

Closure of contacts 74 establishes a circuit from source 138, line 137, contacts 38, 31, now closed, clutch magnet 133, contacts 74, now closed, brush 139, contacts 114 and 113, brush 115, line 16, brush 115a, contacts 113a and 114a, brush 139a, receiver clutch magnet 133a to ground and back to source 138. Energization of magnets 133 and 133a effects connection of the disks 112, 112a to their respective driving motors and, as a consequence thereof, the contacts 114, 114a will be rotated in synchronism and pass successively under the brushes 146 and 146a, respectively.

The contacts 114 and 114a will simultaneously pass under brushes 146, 146a associated with the "A" and "a" wires respectively, and a circuit will be established from source 138, line 137, line 142, contacts 141 and 145, corresponding to the "6" position, the "A" wire, brush 146, contacts 114 and 113, brush 115, line 16, brush 115a, contacts 113a and 114a, brush 146a, the "a" wire, magnets 147 and 163, thereby closing contacts 150 and 165 and opening contacts 164, to common ground wire 140a and back to source 138. The contacts 114, 114a will pass beneath the brushes 146, 146a connected to the "B" and "D" wires and the "b" to "d" wires, respectively, without current flowing, but a substantially similar circuit will be established momentarily through relay magnet 156 when the contacts 114, 114a connect the "E" and "e" wires together, thereby closing contacts 161.

The closing of contacts 161 completes a circuit through the magnet 46a associated with the punch for the "6" index position as follows: Source 168, line 167, contacts 38a and 31a, now closed, contacts 161, already closed, magnet 46a, contacts 150, previously closed, contacts 101a, normally closed, to common ground wire 140 and back to source 168. Energization of magnet 46a shifts the interposer 51a (Fig. 9) to operatively connect the punch in the "6" position to the depressor plate and at the same time closes contacts 74a to energize the punch magnet 66a which will attract its armature 65a thereby perforating the duplicate card in the "6" index position of the first column thereof, at the same time reopening contacts 74a and opening contacts 101a. The release of the armature 65a effects the reopening of contacts 150, 161 and 165 and the reclosing of contacts 101a and 164. The armature 65a also operates the escapement mechanism in the receiver causing the receiver card carriage to move one card column so as to bring the second column of the duplicate card under the punches. The receiving mechanism is now ready for a subsequent punching cycle which may take place when the perforation in the second column of the master card is encountered by a brush 13.

While the above operations of the receiver are taking place, both disks 112, 112a are completing their first revolution. Near the end of each revolution of disk 112, the contact 114 passes beneath two brushes 188 and connects the transmitter punch magnet 66 to the source 138 through wire 137 and the ground. The magnet 66 effects the various operations already described herein such as the operation of the punches, the escaping of the transmitter card carriage one column and the reopening of the contacts 74. By the time the contacts 114, 114a arrive at their normal positions both the transmitter and receiver card carriage will have been moved to the second column in the cards ready for a repetition of the cycle just described.

The contacts 101 and 101a are provided to prevent a second interposer from being operated by its associated magnet 46 or 46a until the previously operated interposer has been almost completely restored, therefore, the contacts 74 and 74a cannot be reclosed by the energization of a magnet 46 or 46a until the previously operated interposer has been fully restored thereby permitting the latches 73 in both transmitter and receiver to reengage the lower contact member of contacts 74 or 74a preparatory to a subsequent operation of an interposer. As soon as contacts 101 are reclosed when the dog 96 rides down into the next interdental tooth space in rack 11 a circuit will be again established through the brush 13 owing to the presence of a perforation in the second column of the master card and a second cycle will be initiated. In other words, a new perforating cycle cannot be initiated until contacts 74 are closed which cannot happen until contacts 101 are reclosed by the escaping of the transmitter card carriage.

The speed of the contacts 114, 114a and the timing of the brushes 146, 188 and 146a with respect to brushes 139, and 139a is such that ample time is allowed for the escaping of both card carriages and the restoration of the various devices to normal position before another cycle may be started. It will be understood that the spacing of the various brushes 139, 139a, 146, 146a and 188 illustrated in Fig. 10 is merely illustrative and diagrammatic.

After the last column of the master card has been analyzed the dog 96 will rest on top of the rack 11 and the contacts 101 will remain open thereby positively preventing repeated operations of the disks 112 and 112a. After the last column of the duplicate card is perforated the contacts 101a will likewise remain open and prevent further operation of the receiver until a blank record card is fed from the receiver card magazine by an operation of the right thumb lever of the receiver.

It is desirable that means be provided to prevent the transmitter from operating in case the receiver card carriage should fail to escape properly or rapidly enough and in case it should jam owing to a damaged card. This means comprises contacts 189 (Fig. 10) similar to the contacts 101a and similarly operated by the receiver escapement locking dog. The contacts 189 are preferably mounted alongside of the contacts 101a and are opened and closed simultaneously with the opening of contacts 101a. The contact 189 opens when the escapement locking dog (which is similar to dog 96 in the transmitter) is raised therefore the establishment of a circuit through clutch magnets 133 and 133a is prevented before the receiver card carriage has fully escaped one column. If the receiver card carriage should jam after having partially escaped the contacts 189 would be still open and the transmitter effectively prevented from operating until the trouble is remedied. This contact also serves to prevent operating the transmitter if the operator at the receiver should fail to feed a blank card into position to be perforated after the card carriage has perforated the last column of a previous card owing to the fact that contacts 101a and 189 remain open after the last column has been perforated.

If desired a duplicate card may also be perforated in the transmitter simultaneously with the perforation of the card in the receiver. This is accomplished by operating the right thumb lever of the transmitter after placing the master card in position on the card table 15, the operation of the right thumb lever effecting the feeding of a blank card into position with the first column under the punches 43. This card may be used as a verification card or for other purposes as desired.

It may be found desirable to control the perforating of the duplicate card in the receiver by operating the transmitter as a key controlled perforator thereby eliminating the necessity of first perforating the master cards in a separate perforating machine. This may be accomplished by placing a blank record card on the card table 15 and operating the transmitter right thumb lever 34 to feed a blank record card from the magazine into position to be perforated. The blank card on the table 15 insulates the brushes 13 and 186 and permits the operation of the keys 50 in the usual manner to perforate the blank card under the punches 43. The interposers 51 will operate as already described by the depression of the keys and the receiver will be controlled by the contacts 141, 144, 145 and 114 in exactly the same manner as if a perforated master card had been used. This feature makes possible a considerable saving in time and labor and may be regarded as a particularly important feature of the invention.

The present invention will be found to be particularly useful in transmitting statistical and accounting data over wire circuits connecting places a considerable distance apart. An illustration of the usefulness of the invention may be seen in the following example. Large manufacturing corporations, particularly in the automobile or electrical machinery industries, often have a number of large factories located throughout the country. Each of these factories usually has its own accounting organization which maintains various kinds of records necessary for its own information and in addition must transmit certain information regularly to the executive offices or some other division of the organization.

This information usually takes the form of written reports and the like which are sent to the executive offices. Most progressive business organizations utilize the perforated card system to keep a record of their statistical and accounting data and it will be obvious that there will be more or less duplication of cards required in order to furnish certain divisions of an organization, such as the executive offices, with certain data required.

When the present invention is employed the preparation of a report from a large batch of cards, will involve sorting the record cards in groups according to the data desired, tabulating said groups, perforating cards with the totals and finally transmitting the data to the division concerned over a wire circuit, utilizing the total cards to control the transmission of the data as described herein, thereby causing the perforation of a duplicate card at the other end of the line and doing away with the necessity of preparing a duplicate set of cards from the report after it has reached the divisions concerned. It will be seen, therefore, that the present invention will effect a considerable saving of time and labor in the transmission of statistical and accounting data between remotely located places by considerably reducing the amount of work required to duplicate certain kinds of data as well as effecting a more speedy reception of the data.

Various other ways in which the present invention may be utilized advantageously will be readily understood by those skilled in the art, therefore, it is not desired to limit the application of this invention to the specific example recited.

The present invention has been shown and described with reference to a specific form of embodiment and applied to a particular type of machine, however, it is understood that it is not limited to the precise form shown as it may be modified in details or embodied in other types of machines as well in order to adapt it to the varying conditions met in practice, all such modifications and adaptations falling within the scope of the following claims:

We claim:

1. A record controlled system comprising a record analyzing device, a coding device controlled thereby, a decoding device operatively connected to said coding device, means controlled by the analyzing device for synchronizing the coding and decoding devices, and perforating mechanism controlled by said decoding device.

2. A system for duplicating record cards comprising a card analyzing member, a coding device controlled thereby, a decoding device, a transmitting media operatively connecting said devices, means controlled by the analyzing device for initiating timed operating relation between said devices, and perforating mechanism controlled by said decoding device.

3. In a record controlled system the combination of devices adapted to read successively presented data designations on a controlling record, coding mechanism controlled by said reading devices, decoding devices controlled by said mechanism, a line circuit connecting said coding and decoding devices, perforating mechanism controlled by said decoding mechanism in accordance with a predetermined code, and means controlled by the perforating mechanism for rendering the coding devices inoperative until the perforating mechanism has completed an operation under control of the decoding devices.

4. A system for duplicating perforated record cards comprising devices for analyzing the perforations of each record card column by column, translating mechanism controlled thereby and adapted to convert each perforation analyzed into a series of electrical impulses according to a predetermined code, a second translating mechanism controlled by said impulses, a line circuit connecting said translating mechanisms, and means controlled by said second translating mechanism for perforating a duplicate record card in accordance with the perforation read by the analyzing devices, and means controlled by the perforating means for holding the line circuit open until the perforating means has completed an operation.

5. A device for transmitting data designated by perforations in a record medium having a plurality of columns, each column having a series of index point positions each of which index point positions identifies a single character, comprising devices for reading said record medium column by column, a series of groups of coding contacts each corresponding to one of said index point positions, means controlled by said reading devices for setting up said contacts according to the value of the index point perforation read and in accordance with a predetermined code, a transmission medium, and means controlled by said first named means for successively connecting said transmission medium to said contacts.

6. A device for transmitting data represented by perforations in record cards, each card having a plurality of columns of index point positions each of which index point positions identifies a single character, comprising an analyzer adapted to read said cards column by column, and coding mechanism controlled thereby including a series of brush circuits less than the number of index point positions in a card column, a series of groups of contacts for establishing a connection to said brush circuits according to a predetermined code, each group corresponding to one of said index point positions, means controlled by said analyzing device for establishing said connection, a transmission medium and means controlled by said last named means for connecting said brush circuits successively to said transmission medium.

7. A device for transmitting data represented by perforations in record cards, each card having a plurality of columns of index point positions each of which identifies a single character, comprising an analyzer adapted to read said cards column by column, and coding mechanism controlled thereby including a series of brush circuits, a series of groups of contacts for establishing a connection to said brush circuits according to a predetermined code, each group corresponding to one of said index point positions, means controlled by said analyzing device for establishing said connection, a transmission medium and means controlled by said last named means for connecting said brush circuits successively to said transmission medium.

8. A device for coding data represented by index point perforations in a record medium each index point position identifying a single character, comprising a plurality of analyzer circuits, one for each index point, a plurality of brush circuits less in number than the analyzer circuits, a local circuit, a plurality of groups of coding contacts each controlled by one of said analyzer circuits, each of said groups including a pair of contacts connected to separate brush circuits in accordance with a prearranged code and a normally ineffective common contact connected to said local circuit and connectable to said pair of contacts, a line circuit, and means controlled by any one of said analyzer circuits for connecting said line successively to said brushes.

9. A device for coding data designations comprising a reading device for said data designations, a plurality of coding contacts arranged to be set up by said reading device, a line circuit, and means controlled by said reading device for successively connecting said line circuit to said contacts.

10. A rotary contact device comprising a constantly driven shaft, a contact member loosely mounted thereon, a plurality of brushes cooperating with said contact member, a clutch element driven by said shaft, a clutch element mounted upon said contact member and capable of a limited movement relative to said member both circumferentially and axially to engage said first named clutch element, means for effecting said movement, means for normally preventing said movement including a latch engaging said contact member and said second named clutch element, and means for releasing said latch.

11. A system for transmitting statistical and accounting data by wire comprising a record analyzer, coding devices controlled thereby including a cyclically operable member, decoding devices controlled by said coding devices including a second cyclically operable member, a transmission medium connecting said members, perforating mechanism controlled by said members conjointly, and means controlled by said analyzer for initiating the operating cycles of said members.

12. A system for transmitting statistical and accounting data by wire comprising a record analyzer, coding devices controlled thereby including a cyclically operable member, decoding devices controlled by said coding devices including a second cyclically operable member, perforating mechanism controlled by said members conjointly, and means controlled by said analyzer for synchronizing said cyclically operable members.

13. In a record card controlled machine the combination of a plurality of code devices controlled by said card and settable according to the index point value of a perforation present in said card, a cyclically operable member cooperating with said devices, and means controlled by said card for initiating the cycle of operations of said member.

14. In a record controlled machine the combination of a record support, a reading device movable relative to said record to read successive columns thereof, coding devices controlled by said reading device including a cyclically operable member, means controlled by said record for initiating the cycle of operation of said member, and means controlled by said member for effecting relative movement of said record and said reading device during each cycle of said member thereby serially coding the perforations of successive columns in said record.

15. In combination, key board mechanism, a coding device controlled thereby, a decoding device, a transmitting media connecting said devices, perforating mechanism controlled by said decoding device, and means controlled by the perforating mechanism for preventing a second operation of the coding device until the perforating mechanism has completed an operation.

In testimony whereof we hereto affix our signatures.

JOSEPH CLARENCE BOLT.
CULF I. JOHNSON.

DISCLAIMER 1,870,230.—*Joseph Clarence Bolt*, Boston, and *Curt I. Johnson*, Worcester, Mass. DISTANCE CONTROL DEVICE. Patent dated August 9, 1932. Disclaimer filed March 17, 1936, by the assignee, *International Business Machines Corporation*.

Hereby enters this disclaimer to claims 2, 9, and 13 in said specification.
[*Official Gazette April 7, 1936.*]